| United States Patent [19] | [11] Patent Number: 4,482,467 |
|---|---|
| Nakamura et al. | [45] Date of Patent: Nov. 13, 1984 |

[54] LIQUID FOR ABSORPTION OF SOLAR HEAT

[75] Inventors: Tadamitsu Nakamura, Yoshikawa; Yogaku Iwamoto, Hiratsuka; Kanichi Kadotani, Atsugi; Tokuo Marui, Kawaguchi, all of Japan

[73] Assignees: Dainichiseika Colour & Chemicals Mfg. Co., Ltd.; Kabushiki Kaisha Komatsu Seisakusho, both of Tokyo, Japan

[21] Appl. No.: 397,983

[22] Filed: Jul. 14, 1982

[30] Foreign Application Priority Data

Jul. 14, 1981 [JP] Japan ................ 56-108854
Apr. 7, 1982 [JP] Japan ................ 57-56629
Apr. 7, 1982 [JP] Japan ................ 57-56630

[51] Int. Cl.³ ................................ C09K 5/00
[52] U.S. Cl. ................................ 252/70; 252/71;
  252/74; 252/75; 252/77; 252/174.17; 252/542;
  165/104.19
[58] Field of Search ............ 252/70, 71, 74, 75,
  252/174.17, 542, 77; 165/104.19

[56] References Cited

U.S. PATENT DOCUMENTS

| 3,000,830 | 9/1961 | Fong et al. | 252/542 |
|---|---|---|---|
| 4,170,984 | 10/1979 | Scheffee | 252/71 |
| 4,221,210 | 9/1980 | Cvijanovich | 252/71 |
| 4,311,603 | 1/1982 | Neary et al. | 252/70 |

FOREIGN PATENT DOCUMENTS 2403373  5/1979  France ................ 252/71

*Primary Examiner*—Paul Lieberman
*Assistant Examiner*—Robert A. Wax
*Attorney, Agent, or Firm*—Armstrong, Nikaido, Marmelstein & Kubovcik

[57] ABSTRACT

A liquid for the absorption of solar heat, useful as an heat-absorbing medium in water heaters and heat collectors, which comprises:

(a) a dispersing medium selected from the group consisting of propylene glycol, mixture of propylene glycol with water, mixture of propylene glycol with water and glycerin, and mixture of glycerin with water, (b) a dispersant selected from the group consisting of polyvinylpyrrolidone, caramel, and mixture of polyvinylpyrrolidone with caramel, and (c) a powdered activated carbon as a black coloring material.

13 Claims, No Drawings

LIQUID FOR ABSORPTION OF SOLAR HEAT

BACKGROUND OF THE INVENTION (1) Field of the Invention

This invention relates to a liquid composition useful as a heat-absorbing medium in water heaters and heat collectors designed for harnessing solar heat.

(2) Description of the Prior Art

The idea of exposing a black liquid to the sunlight thereby causing the liquid to absorb solar heat, then allowing the heated liquid to elevate the temperature of ordinary tap water by exchange of heat, and utilizing the resultant hot water for household or industrial uses has been known in the art. As the liquid for the absorption of solar heat, a solution of a black dye in water and a dispersion of a black pigment in water are used, for example. Heat-absorbing liquids using dyes are not feasible because they fail to withstand prolonged exposure to the sunlight. On the other hand, heat-absorbing liquids using black pigments such as carbon black show high stability under the sunlight. When a heat-absorbing liquid obtained by dispersing carbon black in water with the aid of a dispersant is circulated through pipes in a water heater or a heat collector and caused to absorb solar heat and then passed through a heat exchanger to elevate the temperature of tap water, the carbon black particles dispersed in this liquid are separated and deposited on the inner wall of the pipes and the pipes are divested of capacity for thermal absorption. Further, because of the repeated fluctuation of temperature and owing to the action of the sunlight exerted over a long period, the dispersion has its thermal stability gradually lowered, with the result that carbon black particles will sediment possibly to an extent of depriving completely the heat-absorbing liquid of its function.

SUMMARY OF THE INVENTION

An object of this invention, therefore, is to provide a liquid for the absorption of solar heat, which excels in heat-absorbing property, possesses stability to withstand the sunlight, keeps a black coloring matter stably dispersed therein, and provides safe and consistent service over a long period.

To accomplish the object described above and other objects according to the present invention, there is provided a liquid for the absorption of solar heat which comprises:

(a) a dispersing medium selected from the group consisting of propylene glycol, mixture of propylene glycol with water, mixture of propylene glycol with water and glycerin, and mixture of glycerin with water, (b) a dispersant selected from the group consisting of polyvinylpyrrolidone, caramel, and mixture of polyvinylpyrrolidone with caramel, and (c) a powdered activated carbon as a black coloring material.

DETAILED DESCRIPTION OF THE INVENTION

The heat-absorbing liquid according to this invention contains as a black coloring material powdered activated carbon which has excellent stability to withstand the sunlight. The powdered activated carbon exhibits no desirable dispersibility in water.

In accordance with this invention, powdered activated carbon is used as a black coloring material, propylene glycol, mixture of propylene glycol with water, mixture of propylene glycol with water and glycerin, or mixture of glycerin with water is used as a dispersing medium, and polyvinylpyrrolidone and/or caramel is used as a dispersant. Owing to the specific combination mentioned above, the dispersibility of the powdered activated carbon in the dispersing medium and the stability of the produced dispersion are both excellent. The heat-absorbing liquid produced by the aforementioned combination has been demonstrated to have no possibility of allowing the dispersed activated carbon particles to be separated and deposited on the inner wall of circulation pipes and consequently suffering loss of endothermic efficiency in a prolonged use.

The activated carbon to be used in this invention is what is obtained by carbonizing an organic substance and has heretofore been used for decolorization, deodorization, adsorption, catalysis, etc. It differs in particle structure from carbon black of varying grades used as coloring agent and filler. This activated carbon may be obtained by any of various manufacturing methods such as, for example, the zinc chloride method and the steam method. The particle diameter of the activated carbon is required to be not more than about 10 $\mu$ (i.e. the largest particle diameter should be 10 $\mu$), preferably not more than about 5 $\mu$. The powdered activated carbon satisfying this requirement may be easily obtained by pulverizing commercially available granular activated carbon or powdered activated carbon with an ordinary pulverizing machine or by subjecting the commercially available granular activated carbon or powdered activated carbon to attrition and particle diameter adjustment at the time that the activated carbon is dispersed.

The dispersant to be used in this invention is polyvinylpyrrolidone, caramel, or mixture thereof. Varying grades of polyvinylpyrrolidone having number-average molecular weights ranging from about 5,000 to about 500,000 have been known to the art. Any of these grades of polyvinylpyrrolidone can be used for the purpose of this invention. Such polyvinylpyrrolidone products have been known well for their usefulness as dispersants (protective colloids) such as for pigments, for example. However, the usefulness of such a polyvinylpyrrolidone as a dispersant capable of stably dispersing the activated carbon particles in propylene glycol, mixture of propylene glycol with water, mixture of glycerin with water, or mixture of glycerin with propylene glycol and water has never been known to the art. When the dispersing medium has a relatively small water content, polyvinylpyrrolidone of a relatively low molecular weight exhibits an advantageous dispersion stabilizing property. When the dispersing medium has a relatively large water content, then polyvinylpyrrolidone of a relatively high molecular weight exhibits an advantageous dispersion stabilizing property.

Caramel which is either used in the place of the aforementioned polyvinylpyrrolidone or used as mixed in a desired proportion with polyvinylpyrrolidone is a substance which is obtained by subjecting a saccharide such as glucose or sucrose to a thermal treatment. Otherwise called burnt sugar, caramel has been heretofore used extensively as a natural coloring material. It has been widely marketed by Semba Toka Kogyo, etc. in a variety of grades including glucose-based liquid caramel, sucrose-based liquid caramel, powdered caramel, special liquid caramel, and solid caramel. Similarly to the aforementioned polyvinylpyrrolidone, such caramel proves to be a most desirable dispersant for uniformly and stably dispersing the powdered activated carbon in the aforementioned dispersing medium. When caramel and polyvinylpyrrolidone are used as mixed, their mixing ratio is desired to be in the range of 10 to 200 parts by weight of polyvinylpyrrolidone to 100 parts by weight of caramel.

The dispersing medium to be used in this invention is propylene glycol, mixture of propylene glycol with water, mixture of glycerin with water, or mixture of glycerin, propylene glycol and water as described above. It is only in one of these dispersing media that the powdered activated carbon is uniformly and stably dispersed by the aforementioned dispersant. Glycerin and/or propylene glycol serves not merely as a dispersion medium but also as a dispersing aid and additionally as an antifreezing agent during the use of the heat-absorbing liquid in winter. When a mixture of propylene glycol and/or glycerin with water is used as the dispersing medium, this medium is required to contain at least about 15% by weight of propylene glycol or glycerin or both. When the amount of propylene glycol or glycerin or both is less than 15% by weight based on the mixture, the dispersibility of the powdered activated carbon and the stability of the formed dispersion are both degraded and, at the same time, the freezing point of the dispersing medium is heightened possibly to entail the problem of freezing of the heat-absorbing liquid in winter.

Concerning the mixing ratio of the components which make up the heat-absorbing liquid of the present invention, the proportion of the powdered activated carbon is required to fall in the range of about 0.001 to 10% by weight, preferably 0.01 to 2% by weight, based on the heat-absorbing liquid. If the proportion falls below the lower limit of this range, the heat-absorbing liquid does not provide sufficient absorption of solar heat. If the proportion exceeds the upper limit of the range, no sufficient absorption of solar heat is obtained because the sunlight does not readily reach an appreciable depth of the liquid. The proportion of the dispersant is required to fall in the range of about 0.001 to 30% by weight, preferably about 0.5 to 10% by weight, based on the heat-absorbing liquid. If this proportion falls below the lower limit of the range, the stability of the powdered activated carbon dispersed in the liquid is lowered. If the proportion exceeds the upper limit of the range, the viscosity of the heat-absorbing liquid is increased and the efficiency of heat exchange is lowered. The proportion of the dispersing medium is substantially the remainder of 100% by weight after subtraction of the proportions of the powdered activated carbon and the dispersant. Specifically it is at least about 60% by weight, preferably at least about 88% by weight. If the proportion falls below the lower limit of the range, then the heat-absorbing liquid acquires excessively high viscosity and concentration and suffers the loss of heatexchange efficiency and heat-absorbing efficiency.

When the heat-absorbing liquid uses propylene glycol or mixture of propylene glycol with water as the dispersing medium and polyvinylpyrrolidone as the dispersant, the proportion of the dispersant is required to be in the range of about 0.001 to 20% by weight, preferably about 0.5 to 5% by weight, based on the heat-absorbing liquid.

The essential components for the heat-absorbing liquid of the present invention are as described above. Optionally, the heat-absorbing liquid may incorporate various additives such as emulsifying agent, stabilizer, antiseptic agent, and rustproofing agent as well as water-soluble high molecular compounds.

The heat-absorbing liquid of this invention can be easily prepared by combining the aforementioned components in prescribed proportions and subjecting them to dispersion in an ordinary dispersing machine such as, for example, ball mill, homomixer, attritor, sand mill, colloid mill, and rolls. The heat-absorbing liquid of this invention which is obtained as described above is a black homogeneous liquid useful as a liquid medium for the absorption of solar heat in water heaters and heat collectors. In this particular use, it undergoes countless cycles of rise and fall of temperature over a long period and it remains exposed to the sunlight constantly (in daytime). Under such harsh conditions, it retains its high stability of dispersion intact for a long time. When carbon black is used as conventionally practiced, the carbon black particles separate off and deposit on the inner walls of pipes and other circulating devices in the water heater and heat collector and tend to impair the heat-absorbing efficiency and the heat exchange efficiency notably. In contrast, the heat-absorbing liquid of this invention shows substantially no such inclination. This quality of the heat-absorbing liquid of this invention has far surpassed all expectations arising from the knowledge of attributes proper to activated carbon. Since the heat-absorbing liquid of this invention contains no ionic component, it has no possibility of corroding metal parts of the water heater and heat collector.

Now, the present invention will be described more specifically below with reference to working examples of invention. Needless to mention, these examples are intended solely for illustration of the invention and are not meant as limitations in any respect.

EXAMPLE 1:

In a sand mill, 5 parts by weight of activated carbon (produced by Futamura Chemical Industry Co., Ltd., and marketed under trademark designation of "Kyoryoku-Taiko Gold A"), 5 parts by weight of polyvinylpyrrolidone (produced by General Anilin Film Company and marketed under trademark designation of "PVP K-30; number-average molecular weight of 40,000), 50 parts by weight of propylene glycol, and 40 parts by weight of water were subjected to dispersion, to prepare a dispersion containing activated carbon particles in diameters not exceeding 5 $\mu$. By uniformly mixing by agitation 1 part by weight of this dispersion, 62 parts by weight of water, 35 parts by weight of propylene glycol, and 2 parts by weight of polyvinylpyrrolidone (produced by General Anilin film Company and marketed under trademark designation of "PVP K-90), there was obtained a heat-absorbing liquid having a freezing point of $-15°$ C. When this liquid was continuously heated at 80° C. for six months and then observed under a microscope, it was found that activated carbon particles were dispersed as uniformly and stably as before the heating.

EXAMPLE 2

In a sand mill, 5 parts by weight of activated carbon (produced by Futamura Chemical Industry Co., Ltd. and marketed under trademark designation of "Seisei-Taiko YV-O"), 5 parts by weight of polyvinylpyrrolidone (produced by General Anilin Film Company and marketed under trademark designation of "PVP K-15";

number-average molecular weight of 10,000), 50 parts by weight of propylene glycol, and 40 parts by weight of water were mixed and dispersed until the particle diameters of activated carbon fell below 5 μ. By mixing by agitation 1 part by weight of the resultant dispersion, 97 parts by weight of propylene glycol, and 2 parts by weight of polyvinylpyrrolidone (PVP K-15), there was obtained a heat-absorbing liquid. To test this heat-absorbing liquid for dispersibility of activated carbon, the liquid was subjected to forced circulation through a glass pipe at 60° C. for six months. It was then diluted with water to 25 times the original volume and measured with a spectrophotometer for transmissivity. The transmissivity curve consequently obtained was found to be identical with that of the liquid (as diluted similarly to 25 times the original volume) before the forced circulation, indicating that the stability of the dispersion of activated carbon in the liquid remained intact through the forced circulation. Absolutely no deposition of activated carbon particles was found on the inner wall of the glass pipe.

EXAMPLE 3

By following the procedure of Example 1, a dispersion containing activated carbon particles of diameters not exceeding 5 μ was obtained from 5 parts by weight of activated carbon (produced by Futamura Chemical Industry Co., Ltd. and marketed under trademark designation of "Seisei-Taiko WV-1"), 20 parts by weight of an aqueous 50% polyvinylpyrrolidone solution (having an number-average molecular weight of about 160,000), and 75 parts by weight of water. By uniformly mixing 1 part by weight of the dispersion, 45 parts by weight of water, 4 parts by weight of the same aqueous polyvinylpyrrolidone solution as mentioned above, and 50 parts by weight of propylene glycol, there was obtained a heat-absorbing liquid having a freezing point of −30° C. This heat-absorbing liquid was placed in a coiled tube 5 mm in inside diameter and sealed therein by tightly closing the opposite ends of the tube with rubber stoppers. In a Weather-O-meter kept constantly at 63° C., the liquid as held in the tube was irradiated with the light from a carbon arc for 1,000 hours. When this liquid was observed under a microscope after the irradiation, it was found that activated carbon particles were dispersed as uniformly and stably as before the irradiation. Absolutely no deposition of activated carbon particles was observed on the inner wall of the glass tube.

EXAMPLE 4

The heat-absorbing liquid obtained in Example 1 was placed in a solar-heat water heater and subjected to forced circulation through the pipe of the water heater for six monthes by way of exposure test. After the forced circulation, the heat-absorbing liquid was diluted with water to 25 times the original volume and measured with a spectrophotometer for transmissivity. The transmissivity curve obtained of this liquid was found to be identical with that obtained of the liquid (similarly diluted with water to 25 times the original volume) before the exposure test, indicating that the liquid remained intact through the exposure test.

EXAMPLE 5

In a sand mill, 5 parts by weight of activated carbon (produced by Futamura Chemical Industry Co., Ltd. and marketed under trademark designation of "Taiko K"), 5 parts by weight of polyvinylpyrrolidone (produced by BASF A.G. and marketed under trademark designation of Kollidon 30; number-average molecular weight 40,000), 20 parts by weight of glycerin, and 70 parts by weight of water were subjected to a treatment for dispersion, to afford a dispersion containing activated carbon particles of diameters not exceeding 5 μ.

By uniformly mixing by agitation 1 part by weight of this dispersion, 58 parts by weight of water, 40 parts by weight of glycerin, and 1 part by weight of polyvinylpyrrolidone (produced by BASF A.G. and marketed under trademark designation of "Kollidon 90"; number-average molecular weight 360,000), there was obtained a heat-absorbing liquid having a freezing point of −16° C. When this liquid was continuously heated at 80° C. for six monthes and then observed under a microscope, it was found that activated carbon particles were dispersed as uniformly and stably as before the heating.

EXAMPLE 6

In a ball mill, 5 parts by weight of activated carbon (produced by Futamura Chemical Industry Co., Ltd. and marketed under trademark designation of "Taiko M"), 5 parts by weight of caramel (produced by Semba Toka Kogyo K.K. and marketed under trademark designation of "S-W"), 30 parts by weight of glycerin, 20 parts by weight of propylene glycol, and 40 parts by weight of water were subjected to a treatment for dispersion until the particle diameters of activated carbon particles fell below 5 μ. Consequently, there was obtained a dispersion.

By mixing 1 part by weight of this dispersion, 50 parts by weight of glycerin, 10 parts by weight of propylene glycol, 4 parts by weight of the aforementioned caramel, and 35 parts by weight of water, there was obtained a heat-absorbing liquid. To test the heat-absorbing liquid for dispersibility of activated carbon, this liquid was subjected to forced circulation through a glass pipe at 60° C. for six months, then diluted with water to 25 times the original volume, and measured with a spectrophotometer for transmissivity. The transmissivity curve obtained of this liquid was found to be identical with that obtained of the liquid (similarly diluted with water to 25 times the original volume) before the forced circulation, indicating that the liquid retained the stability of dispersion intact through the forced circulation. Absolutely no deposition of activated carbon particles was observed on the inner wall of the glass pipe.

EXAMPLE 7

A heat-absorbing liquid having a freezing point of =20° C. was obtained by uniformly mixing 1 part by weight of the same dispersion as obtained in Example 5, 1 part by weight of polyvinylpyrrolidone (produced by BASF A.G. and marketed under trademark designation of "Kollidon 90"), 20 parts by weight of glycerin, 30 parts by weight of propylen glycol, and 48 parts by weight of water. This heat-absorbing liquid was placed in a coiled tube 5 mm in inside diameter and sealed therein by tightly closing the opposite ends of the tube with rubber stoppers. Within a Fade-O-meter kept constantly at 63° C., the liquid as held in the coiled tube was irradiated with the light from a carbon arc for 1,000 hours. When the liquid was observed under a microscope after the irradiation, it was found that activated carbon particles were dispersed as uniformly and stably as before the irradiation. Absolutely no deposition of activated carbon particles was found on the inner wall of the glass pipe.

EXAMPLE 8

A heat-absorbing liquid having a freezing point of −35° C. was obtained by uniformly mixing by agitation 1 part by weight of the same dispersion as obtained in Example 5, 3 parts by weight of polyvinylpyrrolidone (produced by BASF A.G. and marketed under trademark designation of "Kollidon 30"), 2 parts by weight of caramel (produced by Semba Toka Kogyo K.K. and marketed under trademark designation of "S-W"), 60 parts by weight of glycerin, 0.1 part by weight of sodium hexametaphosphate, 0.1 part by weight of disodium phosphate, and 33.8 parts by weight of water. When this liquid was continuously heated at 80° C. for six months and then observed under a microscope, it was found that activated carbon particles were dispersed as uniformly and stably as before the heating.

EXAMPLE 9

When the procedure of Example 5 was repeated except that polyvinylpyrrolidone used in Example 5 was substituted by the equal amount of caramel (produced by Semba Toka Kogyo K.K. and marketed under trademark designation of "S-W"), there were obtained equal results.

EXAMPLE 10

The heat-absorbing liquids obtained in Examples 5–8 were severally placed in solar-heat water heaters and subjected to forced circulation for six months by way of exposure test. The heat-absorbing liquids after the forced circulation were diluted with water to 25 times the original volume and measured with a spectrophotometer for transmissivity. The transmissivity curves obtained of these liquids were found to be identical with those obtained of the liquids (similarly diluted with water to 25 times the original volume) before the forced circulation, indicating that the liquids remained intact through the exposure test.

EXAMPLE 11

In a sand mill, 5 parts by weight of activated carbon (produced by Futamura Chemical Industry Co., Ltd. and marketed under trademark designation of "Taiko Y"), 5 parts by weight of caramel (produced by Semba Chemical Industry Co., Ltd. and marketed under trademark designation of "S-W"), 50 parts by weight of propylene glycol, and 40 parts by weight of water were subjected to a treatment for dispersion, to afford a dispersion containing activated carbon particles of diameters not exceeding 5 μ.

A heat-absorbing liquid having a freezing point of −15° C. was obtained by uniformly mixing by agitation 1 part by weight of the dispersion, 60 parts by weight of water, 35 parts by weight of propylene glycol, and 4 parts by weight of the same caramel as described above.

When this liquid was continuously heated at 80° C. for six months and then observed under a microscope, it was found that activated carbon particles were dispersed as uniformly and stably as before the heating.

EXAMPLE 12

In a sand mill, 5 parts by weight of activated carbon (produced by Futamura Chemical Industry Co., Ltd. and marketed under trademark designation of "Taiko K"), 5 parts by weight of caramel (produced by Semba Toka Kogyo K.K. and marketed under trademark designation of "KS-W"), 50 parts by weight of propylene glycol, and 40 parts by weight of water were subjected to a treatment for dispersion until the particle diameters of activated carbon fell below 5 μ. Consequently, there was obtained a dispersion.

A heat-absorbing liquid was obtained by mixing by agitation 1 part by weight of this dispersion, 35 parts by weight of propylene glycol, 2 parts by weight of the aforementioned caramel, and 62 parts by weight of water. To test this heat-absorbing liquid for dispersibility of activated carbon, this liquid was subjected to forced circulation through a glass pipe at 60° C. for six months and then diluted with water to 25 times the original volume and measured with a spectrophotometer for transmissivity. The transmissivity curve obtained of this liquid was found to be identical with that obtained of the liquid (similarly diluted with water to 25 times the original volume) before the forced circulation, indicating that the liquid retained the stability of dispersion intact through the forced circulation. Absolutely no deposition of activated carbon particles was found on the inner wall of the glass pipe.

EXAMPLE 13

In a ball mill, 5 parts by weight of activated carbon (produced by Futamura Chemical Industry Co., Ltd. and marketed under trademark designation of "Taiko W"), 5 parts by weight of caramel (produced by Semba Toka Kogyo K.K. and marketed under trademark designation of "M-W"), 5 parts by weight of polyvinylpyrrolidone (produced by BASF A.G. and marketed under trademark designation of "Kollidon 30"), 20 parts by weight of propylene glycol, and 65 parts by weight of water were mixed until the particle diameters of the activated carbon fell below 5 μ. Consequently, there was obtained a dispersion.

A heat-absorbing liquid was obtained by uniformly mixing 1 part by weight of this dispersion, 2 parts by weight of the aforementioned caramel, 1 part by weight of polyvinylpyrrolidone (produced by BASF A.G. and marketed under trademark designation of "Kollidon 90"), 40 parts by weight of propylene glycol, and 56 parts by weight of water.

This liquid was placed in a coiled tube 5 mm in inside diameter and sealed therein by tightly closing the opposite ends of the tube with rubber stoppers. Within a Fade-O-meter kept constantly at 63° C., the liquid as held in the tube was irradiated with the light from a carbon arc for 1,000 hours. When the liquid was observed through a microscope after the irradiation, it was found that activated carbon particles were dispersed as uniformly and stably as before the irradiation. Absolutely no deposition of activated carbon particles was observed on the inner wall of the glass pipe.

EXAMPLE 14

The heat-absorbing liquids obtained in Examples 11–13 were severally placed in solar-heat water heaters and subjected to forced forced circulation for six months by way of exposure test. The liquids after the exposure test were each diluted with water to 25 times the original volume and measured with a spectrophotometer for transmissivity. The transmissivity curves obtained of these liquids were found to be identical with those obtained of the liquids (similarly diluted with water to 25 times the original volume) before the exposure test, indicating that the liquids remained intact through the exposure test.

What is claimed is;

1. A liquid for the absorption of solar heat, which comprises:
   (a) a dispersing medium selected from the group consisting of propylene glycol, mixture of propylene glycol with water, mixture of propylene glycol with water and glycerin, and mixture of glycerin with water,
   (b) a dispersant selected from the group consisting of polyvinylpyrrolidone, caramel, and mixture of polyvinylpyrrolidone with caramel, and
   (c) a powdered activated carbon as a black coloring material.

2. A liquid according to claim 1, wherein the dispersing medium is a mixture of propylene glycol with water which contains at least 15% by weight of propylene glycol.

3. A liquid according to claim 1, wherein the dispersing medium is a mixture of propylene glycol and glycerin with water which contains a total of at least 15% by weight of propylene glycol and glycerin.

4. A liquid according to claim 1, wherein the dispersing medium is a mixture of glycerin with water which contains at least 15% by weight of glycerin.

5. A liquid according to claim 1, wherein the dispersant is polyvinylpyrrolidone having a number-average molecular weight in the range of 5,000 to 500,000.

6. A liquid according to claim 1, wherein the dispersant is a mixture of caramel with polyvinylpyrrolidone which has caramel and polyvinylpyrrolidone mixed at a ratio of 100:10–200.

7. A liquid according to claim 1, wherein the proportion of the dispersant to the heat-absorbing liquid is in the range of 0.001 to 30% by weight.

8. A liquid according to claim 1, wherein the proportion of the dispersant to the heat-absorbing liquid is in the range of 0.5 to 10% by weight.

9. A liquid according to claim 1, wherein the particles of powdered activated carbon have diameters not exceeding 10 $\mu$.

10. A liquid according to claim 1, wherein the particles of powdered activated carbon have diameters not exceeding 5 $\mu$.

11. A liquid according to claim 1, wherein the proportion of the powdered activated carbon to the heat-absorbing liquid is in the range of 0.001 to 10% by weight.

12. A liquid according to claim 1, wherein the proportion of the powdered activated carbon to the heat-absorbing liquid is in the range of 0.01 to 2% by weight.

13. A liquid according to claims 1, 2, 5, or 9, wherein the dispersing medium is propylene glycol or a mixture of propylene glycol with water, the dispersant is polyvinylpyrrolidone, and the black coloring material is powdered activated carbon, the proportion of polyvinylpyrrolidone in the heat-absorbing liquid is in the range of 0.001 to 20% by weight, and the proportion of the powdered activated carbon in the heat-absorbing liquid is in the range of 0.001 to 10% by weight.

* * * * *